Jan. 21, 1947.  L. G. MITBY ET AL  2,414,757
OPHTHALMIC MOUNTING
Filed March 16, 1944
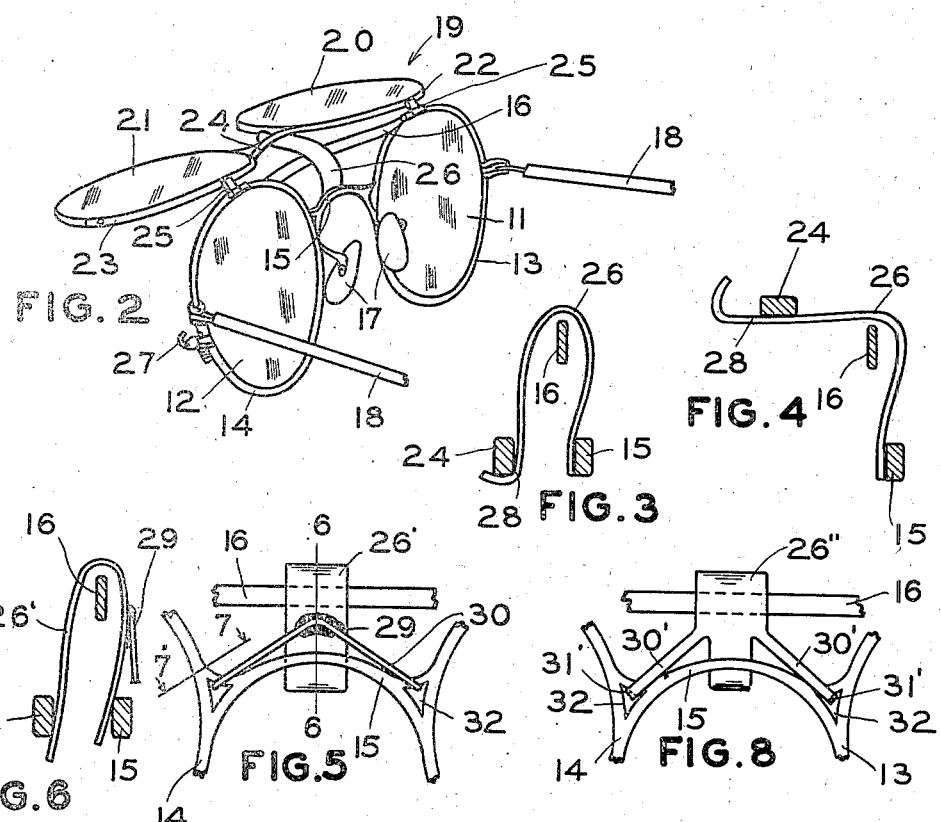
LLOYD G. MITBY
JOHN R. RAMSTORF
INVENTOR
BY
ATTORNEYS Patented Jan. 21, 1947

2,414,757

UNITED STATES PATENT OFFICE 2,414,757

OPHTHALMIC MOUNTING

Lloyd G. Mitby and John R. Ramstorf, Minneapolis, Minn., assignors to Bausch & Lomb Optical Company, Rochester, N. Y., a corporation of New York Application March 16, 1944, Serial No. 526,723

3 Claims. (Cl. 88—41)

This invention relates to ophthalmic mountings and goggles and more particularly has reference to supplementary lens attachments which are hingedly connected to spectacles and goggles. In spectacles and goggles of this type, it is customary to provide spring means for normally urging the supplementary lenses out of cooperative relation with the spectacle or goggle and retaining means for selectively holding the supplementary lenses in front of the spectacle or goggle in cooperative relation thereto.

It is an object of our invention to provide improved spring means in spectacles and goggles of the type described for normally urging the supplementary lenses away from the spectacle or goggle. A further object is to provide detachable spring means in devices of the type described whereby the supplementary lenses and frame may be selectively detached from the spectacle or goggle. These and other objects and advantages reside in certain novel features of construction, arrangement and combination of parts as will hereinafter be more fully described and pointed out in the appended claims.

Referring to the drawing:

Fig. 1 is a front perspective view of a spectacle embodying our invention.

Fig. 2 is a rear perspective view thereof showing the supplementary lenses swung away from the spectacle.

Figs. 3 and 4 are sectional views showing, respectively, the positions of the spring when the supplementary lenses are in and out of cooperative relation with the spectacle.

Fig. 5 is a rear view of the bridge and a modified spring member.

Fig. 6 is a section on line 6—6 of Fig. 5.

Fig. 7 is a section on line 7—7 of Fig. 5.

Fig. 8 is a view of another modification.

A preferred embodiment of our invention is shown in the drawing wherein 10 indicates a spectacle frame having the lenses 11 and 12 mounted, respectively, in eyewires 13 and 14 connected by a bridge 15 and a brace bar 16. The nasal sides of the eyewires carry the usual nose engaging pads 17 while the temporal sides of the eyewires pivotally support temples 18.

The supplementary spectacle 19 comprises the lenses 20 and 21 held, respectively, in eyewires 22 and 23 connected by bridge 24. The supplementary spectacle is hingedly connected to the spectacle 19 by hinges 25 secured to the upper parts of the respectively adjacent eyewires.

The supplementary spectacle 19 is normally urged away from the spectacle 10 by a leaf spring member 26 having one end portion secured to bridge 15 by soldering, welding or any other suitable method. The spring member 26 extends upwardly from bridge 15, thence downwardly behind the bridge 24 and thence under the bridge 24 as shown in Figs. 1 and 3 of the drawing. In this position of the spring 26, the supplementary spectacle is positioned in cooperative relation in front of the spectacle frame 10 and is selectively held in such position by any suitable means, such as pivoted catch 27, more fully disclosed in United States Patent No. 2,282,637.

Upon release of the catch 27, the spring member 26 urges the supplementary spectacle 19 away from and out of cooperative relation with the frame 10, as shown in Fig. 2. This is accomplished because the spring member 26 has one of its ends secured to bridge 15 while the other end portion 28 of the spring is in sliding contact with the bridge 24 of the supplementary spectacle 19. When the supplementary spectacle is in the position shown in Fig. 2, the spring member 26 is positioned with respect to the bridges 15 and 24 as shown in Fig. 4.

In the modification shown in Figs. 5, 6 and 7, the end portion of leaf spring member 26' carries a resilient member 29 which is secured thereto by soldering, welding or any other suitable method. The member 29 has two laterally extending arms 30 having hooked ends 31 which engage the apertures 32 at the respective sides of bridge 15. With this construction, the leaf spring member 26' is detachably secured to frame 10. A further modification is shown in Fig. 8 wherein the end portion of leaf spring member 26'' has two integral arms 30' which extend laterally so that the hooked ends 31' of the arms may engage the apertures 32 of the bridge 15.

It is to be understood that Figs. 5-8 merely show modified structures for detachably securing the end of the leaf spring member to the bridge 15 instead of employing the soldering or welding as disclosed in Figs. 1-4. By providing a detachable spring member and removable hinge pins for hinges 25, the operator may readily detach the supplementary frame 19 from the spectacle 10 when it is desired to use only the spectacle 10 for long periods of time.

From the foregoing, it will be apparent that we are able to attain the objects of our invention and provide an improved spring member for normally urging a hinged supplementary spectacle away from the spectacle to which it is attached. With our improved construction, the springs may be readily replaced when they break and it also is possible to provide springs which are strong enough to swing out the supplementary frame even when carrying relatively thick, heavy lenses. It will be obvious that our invention may be applied to either spectacles or goggles and the use of the term "spectacle" throughout the specification is to be understood as including goggles. The supplementary frame 19 may, of course, carry lenses which may be tinted or otherwise formed to provide supplementary protection against harmful light rays or mechanical shock. Various modifications can obviously be made without departing from the spirit of our invention as pointed out in the appended claims.

We claim:

1. In a spectacle frame having a supplementary frame connected thereto by hinge means positioned at the tops of the frames, the combination of means yieldably urging the supplementary frame away from the first-named frame, said means comprising a leaf spring member, arms extending laterally from said member, said arms engaging parts of the bridge of the first-named frame for detachably securing the member thereto, the member extending upwardly from said last-named bridge, thence downwardly and in contact with the underside of the bridge of the supplementary frame when the latter is held in cooperative relation to the first-named frame.

2. A spectacle frame having a bridge provided with apertures, a supplementary frame carrying lenses hingedly connected to the upper parts of the spectacle frame, spring means yieldably urging the supplementary frame away from the spectacle frame, retaining means for selectively holding the supplementary frame in front of the spectacle frame against the tension of the spring means, said spring means comprising a spring member having arms extending laterally therefrom and secured in said apertures for detachably holding the member to the spectacle frame, said member extending under the bridge of the supplementary frame and having sliding contact therewith.

3. In a spectacle frame having a supplementary frame secured thereto by hinge means attached to the upper parts of the frames whereby the supplementary frame may be positioned in front of or swung away from the first-named frame, means yieldably urging the supplementary frame away from the first-named frame, said means comprising a spring member, and means for detachably securing one end of the member to an upper part of the first-named frame, said member extending along the rear and under sides of a bridge member of the supplementary frame and having sliding engagement therewith when the supplementary frame is moved on the hinge means.

LLOYD G. MITBY.
JOHN R. RAMSTORF.